United States Patent
Mishra et al.

(10) Patent No.: US 10,059,778 B2
(45) Date of Patent: Aug. 28, 2018

(54) PRODUCTION OF POLY ALPHA-1,3-GLUCAN FILMS

(71) Applicant: E I DU PONT DE NEMOURS AND COMPANY, Wilmington, DE (US)

(72) Inventors: Vindhya Mishra, Wilmington, DE (US); T Joseph Dennes, Parkesburg, PA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 14/589,165

(22) Filed: Jan. 5, 2015

(65) Prior Publication Data

US 2015/0191550 A1 Jul. 9, 2015

Related U.S. Application Data

(60) Provisional application No. 61/923,900, filed on Jan. 6, 2014, provisional application No. 61/928,571, filed on Jan. 17, 2014.

(51) Int. Cl.
| | |
|---|---|
| *C08B 37/00* | (2006.01) |
| *B29C 41/12* | (2006.01) |
| *C08J 5/18* | (2006.01) |
| *C08L 5/00* | (2006.01) |
| *B29K 105/00* | (2006.01) |
| *B29L 7/00* | (2006.01) |

(52) U.S. Cl.
CPC .......... *C08B 37/0009* (2013.01); *B29C 41/12* (2013.01); *C08J 5/18* (2013.01); *C08L 5/00* (2013.01); *B29K 2005/00* (2013.01); *B29K 2105/0038* (2013.01); *B29L 2007/008* (2013.01); *C08J 2305/00* (2013.01)

(58) Field of Classification Search
CPC . C08B 37/0009; B29C 41/12; B29K 2005/00; B29L 2007/008
USPC ..................................... 536/123.12; 264/299
See application file for complete search history.

(56) References Cited

U.S. PATENT DOCUMENTS

| | | | |
|---|---|---|---|
| 2,478,425 | A | 8/1949 | Richter et al. |
| 2,817,592 | A | 12/1957 | Novak et al. |
| 3,285,765 | A | 11/1966 | Cannon |
| 4,306,059 | A | 12/1981 | Yokobayashi et al. |
| 4,306,060 | A | 12/1981 | Ikemoto |
| 4,415,734 | A | 11/1983 | Yabune et al. |
| 4,501,886 | A | 2/1985 | O'Brien |
| 4,562,020 | A | 12/1985 | Hijiya et al. |
| 4,590,107 | A | 5/1986 | Bridgeford |
| 5,712,107 | A | 1/1998 | Nichols |
| 6,087,559 | A | 7/2000 | Nichols |
| 6,127,602 | A | 10/2000 | Nichols |
| 6,127,603 | A | 10/2000 | Nichols |
| 6,284,479 | B1 | 9/2001 | Nichols |
| 6,323,338 | B1 | 11/2001 | Potter et al. |
| 6,465,203 | B2 | 10/2002 | Nichols |
| 6,624,300 | B2 | 9/2003 | Potter et al. |
| 7,000,000 | B1 | 2/2006 | O'Brien |
| 8,013,148 | B2 | 9/2011 | Takaha et al. |
| 8,642,757 | B2 | 2/2014 | O'Brien et al. |
| 8,753,668 | B2 | 6/2014 | Sedmak |
| 8,828,689 | B2 | 9/2014 | Caimi et al. |
| 8,871,474 | B2 | 10/2014 | Payne et al. |
| 8,962,282 | B2 | 2/2015 | Caimi et al. |
| 9,034,092 | B2 | 5/2015 | O'Brien |
| 9,080,195 | B2 | 7/2015 | O'Brien et al. |
| 9,096,956 | B2 | 8/2015 | Shiflett et al. |
| 9,139,718 | B2 | 9/2015 | Paullin et al. |
| 9,175,423 | B2 | 11/2015 | O'Brien et al. |
| 9,212,301 | B2 | 12/2015 | O'Brien et al. |
| 9,278,988 | B2 | 3/2016 | Kasat et al. |
| 9,334,584 | B2 | 5/2016 | O'Brien et al. |
| 9,365,955 | B2 | 6/2016 | Opper |
| 9,403,917 | B2 | 8/2016 | Kasat et al. |
| 9,540,747 | B2 | 1/2017 | O'Brien |
| 2001/0051716 | A1 | 12/2001 | Bengs et al. |
| 2006/0134417 | A1 | 6/2006 | Takaha et al. |
| 2013/0087938 | A1 | 4/2013 | O'Brien et al. |
| 2013/0157316 | A1 | 6/2013 | Caimi et al. |
| 2013/0161562 | A1 | 6/2013 | O'Brien et al. |
| 2013/0161861 | A1 | 6/2013 | O'Brien et al. |
| 2013/0168895 | A1 | 7/2013 | Opper |
| 2013/0196384 | A1 | 8/2013 | Caimi et al. |
| 2013/0214443 | A1 | 8/2013 | Shiflett et al. |
| 2013/0244287 | A1 | 9/2013 | O'Brien et al. |
| 2013/0244288 | A1 | 9/2013 | O'Brien et al. |
| 2013/0313737 | A1 | 11/2013 | O'Brien |
| 2014/0087431 | A1 | 3/2014 | Payne et al. |
| 2014/0113821 | A1 | 4/2014 | Lehtovaara |

(Continued)

FOREIGN PATENT DOCUMENTS

| | | |
|---|---|---|
| CN | 1283633 A | 2/2001 |
| CN | 101545150 A | 9/2009 |

(Continued)

OTHER PUBLICATIONS

Zhang et al. Dissolution and Regeneration of Cellulose in NaOH/Thiourea Aqueous Solution. J Polym Sci Part B: Polym Phys 40: 1521-1529, 2002.*
Zhang et al. Effects of urea and sodium hydroxide on the molecular weight and conformation of alpha-(1-3)-D-glucan from Lentinus edodes in aqueous solution. Carbohydrate Research 327 (2000) 431-438.*
PCT International Search Report and Written Opinion for International application No. PCT/US2015/010139, dated Apr. 29, 2015.
U.S. Appl. No. 61/532,714, filed Sep. 9, 2011, Applicant John P. O'Brien et al.
Applied Fibre Science, F. Happey, Ed., Chapter 8, E. Atkins, Academic Press, New York, 1979 (Book not included).
Cantarel et al., 'The carbohydrate-active enzymes database (CAZY): an expert resource for glycogenomics,' Nucleic Acids Research, 2009, vol. 37, Database Issue, pp. D233-D238.

(Continued)

Primary Examiner — Yih-Horng Shiao

(57) ABSTRACT

The present invention is directed toward a process for making a poly alpha-1,3-glucan film. These films can be transparent or translucent and used in packaging applications.

7 Claims, No Drawings

(56) References Cited

U.S. PATENT DOCUMENTS

| | | |
|---|---|---|
| 2014/0179913 A1 | 6/2014 | Paullin et al. |
| 2014/0187766 A1 | 7/2014 | Kasat et al. |
| 2014/0187767 A1 | 7/2014 | Kasat et al. |
| 2014/0323715 A1 | 10/2014 | Kasat et al. |
| 2015/0126730 A1 | 5/2015 | O'Brien |
| 2015/0225877 A1 | 8/2015 | O'Brien |
| 2015/0232785 A1 | 8/2015 | Paullin et al. |
| 2015/0353649 A1 | 12/2015 | Paullin et al. |
| 2016/0053061 A1 | 2/2016 | Durnberger et al. |
| 2016/0053406 A1 | 2/2016 | Durnberger et al. |
| 2016/0060792 A1 | 3/2016 | Durnberger et al. |
| 2016/0138195 A1 | 5/2016 | Kraft et al. |
| 2016/0138196 A1 | 5/2016 | Roder et al. |
| 2016/0144065 A1 | 5/2016 | Roder et al. |
| 2016/0177471 A1 | 6/2016 | Kraft et al. |
| 2016/0251453 A1 | 9/2016 | Kasat et al. |
| 2016/0304629 A1 | 10/2016 | Kasat et al. |
| 2016/0311935 A1 | 10/2016 | Dennes et al. |
| 2016/0326269 A1 | 11/2016 | Dennes et al. |
| 2016/0333117 A1 | 11/2016 | Massouda et al. |
| 2016/0333157 A1 | 11/2016 | Massouda et al. |

FOREIGN PATENT DOCUMENTS

| | | |
|---|---|---|
| CN | 102766220 A | 11/2012 |
| JP | 2002535501 A | 10/2002 |
| TW | 504525 B | 10/2002 |
| WO | 0043580 | 7/2000 |
| WO | 00/49052 | 8/2000 |
| WO | 2005010093 A1 | 2/2005 |
| WO | 2013/036918 A2 | 3/2013 |
| WO | 2013/036968 A1 | 3/2013 |
| WO | 2013052730 A1 | 4/2013 |
| WO | 2013096502 A1 | 6/2013 |
| WO | 2013096511 A1 | 6/2013 |
| WO | 2013101854 A1 | 7/2013 |
| WO | 2013177348 A1 | 11/2013 |
| WO | 2014052386 A2 | 4/2014 |
| WO | 2014099724 A1 | 6/2014 |
| WO | 2014105696 A1 | 7/2014 |
| WO | 2014105698 A1 | 7/2014 |
| WO | 2014161018 A1 | 10/2014 |
| WO | 2014161019 A1 | 10/2014 |
| WO | 2014165881 A1 | 10/2014 |
| WO | 2014201479 A1 | 12/2014 |
| WO | 2014201480 A1 | 12/2014 |
| WO | 2014201481 A1 | 12/2014 |
| WO | 2014201482 A1 | 12/2014 |
| WO | 2014201483 A1 | 12/2014 |
| WO | 2014201484 A1 | 12/2014 |
| WO | 2015069828 A1 | 5/2015 |
| WO | 2015094402 A1 | 6/2015 |
| WO | 2015095046 A1 | 6/2015 |
| WO | 2015095358 A1 | 6/2015 |
| WO | 2015103531 A1 | 7/2015 |
| WO | 2015109064 A1 | 7/2015 |
| WO | 2015109066 A1 | 7/2015 |
| WO | 2015109164 A1 | 7/2015 |

OTHER PUBLICATIONS

Cerqueira et al., 'Optimization of sugarcane bagasse cellulose acetylation,' Carbohydrate Polymers, 2007, vol. 69, pp. 579-582.

CN 102766220A Machine translation.

Kiho et al., (1.fwdarw.3)-alpha-d-glucan from an alkaline extract of agrocybe cylindracea and antitumor activity of its 0-(carboxymethyl)ated derivatives, Carbohydrate Research, 1989, vol. 189, pp. 273-279.

Le Moigne et al., 'Physics of cellulose xanthate dissolution in sodium hydroxide-water mixtures: a rheo-optical study,' cellulose Chem. Technol., 2010, vol. 44(7-8), pp. 217-221.

Ogawa et al., 'Conformation of (1-3)-to-glucan tribenzoate,' Biosci Biotech Biochem, 1993, vol. 57 (10), pp. 1663-1665.

Ogawa et al., 'Crystal structure of (1->3)-alpha-d-glucan,' Water-soluble polymers: synthesis, solution properties and applications, American Chemical Society, Jan. 1, 1980, vol. 141, pp. 353-362.

Ogawa et al., 'Molecular and crystal structure of the regenerated form of (I>3)-alpha-d-glucan,' International Journal of Biological Macromolecules,' Feb. 1, 1981, vol. 3, No. 1, pp. 31-36.

Ogawa et al., 'X-ray diffraction data for (1>3)-alpha-d-glucan triacetate,' Carbohydrate Polymers, Jan. 1, 1983, vol. 3, No. 4, pp. 287-297.

Ogawa et al., 'X-ray diffraction data for (I>3)-alpha-d-glucan,' Carbohydrate Research, Oct. 1, 1979, vol. 75, pp. Cl3-Cl6.

Shida et al., 'A (1/AR3-)-Alpha-D-Glucan isolated from the fruit bodies of lentinus edodes,' Carbohydrate Research, 1978, vol. 60, No. 1, pp. 117-127.

Simpson et al., 'Four glucosyltransferases, GtfJ, GtfK, GtfL and GtfM from Streptococcus salivarius ATCC 25975,' Microbiology, 1995, vol. 141, pp. 1451-1460.

Synytsya et al., 'Structural analysis of glucans,' Annals of Translational Medicine, Feb. 1, 2014, vol. 2, No. 2, 14 pages.

Villares et al., 'Structural features and healthy properties of polysaccharides occurring in mushrooms,' Agriculture, Dec. 18, 2012, vol. 2, No. 4, pp. 452-471.

Yui et al., 'Molecular and crystal structure of (1>3)-alpha-d-glucan triacetate,' International Journal of Biological Macromolecules, Apr. 1, 1992, vol. 14, No. 2, pp. 87-96.

PCT International Search Report and Written Opinion issued for PCT/US2013/076905, dated Feb. 25, 2014.

PCT International Search Report and Written Opinion issued for PCT/US2014/044281, dated Sep. 3, 2014.

PCT International Search Report and Written Opinion issued for PCT/US2013/076919, dated Feb. 25, 2014.

* cited by examiner

PRODUCTION OF POLY ALPHA-1,3-GLUCAN FILMS

CROSS-REFERENCE TO RELATED APPLICATION

This invention claims the benefit of priority of U.S. Provisional Application Nos. 61/923,900, filed on Jan. 6, 2014, and 61/928,571, filed on Jan. 17, 2014, the entirety of which are herein incorporated by reference.

FIELD OF THE INVENTION

This invention relates to poly alpha-1,3-glucan films and methods of their preparation.

BACKGROUND

Glucose-based polysaccharides and their derivatives can be of potential industrial application.

Cellulose is a typical example of such a polysaccharide and is comprised of beta-1,4-D-glycosidic linkages of hexopyranose units. Cellulose is used for several commercial applications such as in manufacture of fibers and films (cellophane). Cellulose for industrial applications is derived from wood pulp. Solutioning of wood pulp is a difficult procedure. For cellophane production the most commonly used process for dissolution of cellulose is the 'viscose process' where the cellulose is converted to cellulose xanthate made by treating a cellulose compound with sodium hydroxide and carbon disulfide. The cellulose xanthate solution is extruded into a coagulation bath, where it is regenerated upon coagulation to form a cellulose film. Cellophane film has several desirable attributes like clarity, barrier to oxygen, mechanical strength etc. which has resulted in its application as a packaging film. However the disadvantage is the use of this viscose process in cellophane manufacture, which involves toxic chemicals and significant environmental costs.

Amongst polysaccharide polymers, glucan polymers, with alpha-1,3-glycoside linkages, have been shown to possess significant advantages. U.S. Pat. No. 7,000,000 disclosed preparation of a polysaccharide fiber comprising a polymer with hexose units, wherein at least 50% of the hexose units within the polymer were linked via alpha-1,3-glycoside linkages, and a number average degree of polymerization of at least 100. A glucosyltransferase enzyme from *Streptococcus salivarius* (gtfJ) was used to produce the polymer. The polymer alpha-1,3-glucan was acetylated in order to render the polymer soluble in the spinning solvent. The acetylated polymer was then dissolved in a mixture of trifluoro-acetic acid and dichloromethane. From this solution continuous, strong, fibers of glucan acetate were spun. These glucan acetate fibers can subsequently be de-acetylated to form fibers composed of alpha-1,3-glucan.

It would be desirable to make films composed of a polysaccharide alpha-1,3-glucan polymer which have properties comparable to cellophane, without the need for a derivatization step. In addition, elimination of the use of hazardous chemicals such as carbon disulfide required for xanthation of cellulose would be desirable.

SUMMARY

The present invention is directed toward a process for making a poly alpha-1,3-glucan film comprising: (a) dissolving poly alpha-1,3-glucan in a solvent composition to provide a solution of poly alpha-1,3-glucan; (b) contacting the solution of poly alpha-1,3-glucan with a surface; and (c) removing the solvent composition to form a poly alpha-1,3-glucan film.

The present invention is also directed toward a poly alpha-1,3-glucan film made according to a process for making a poly alpha-1,3-glucan film comprising: (a) dissolving poly alpha-1,3-glucan in a solvent composition to provide a solution of poly alpha-1,3-glucan; (b) contacting the solution of poly alpha-1,3-glucan with a surface; and (c) removing the solvent composition to form a poly alpha-1,3-glucan film.

The present invention is also directed toward a film comprising poly alpha-1,3-glucan.

DETAILED DESCRIPTION

The term "film" used herein refers to a thin, visually continuous, free-standing material.

The term "packaging film" used herein refers to a thin, visually continuous material partially or completely encompassing an object.

The terms "poly alpha-1,3-glucan", "alpha-1,3-glucan polymer" and "glucan polymer" are used interchangeably herein. Poly alpha-1,3-glucan is a polymer where the structure of poly alpha-1,3-glucan can be illustrated as follows (where n is 8 or more):

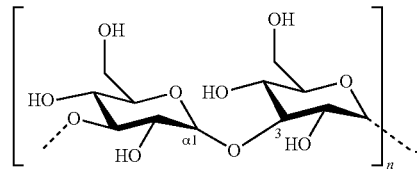

This invention relates to the method of production of films produced from a polysaccharide poly alpha-1,3-glucan. Poly alpha-1,3-glucan, useful for certain embodiments of the disclosed invention, can be prepared using chemical methods. Alternatively, it can be prepared by extracting it from various organisms, such as fungi, that produce poly alpha-1,3-glucan. Poly alpha-1,3-glucan useful for certain embodiments of the disclosed invention can also be enzymatically produced from renewable resources, such as sucrose, using one or more glucosyl-transferase (e.g., gtfJ) enzyme catalysts found in microorganisms as described in the co-pending, commonly owned U.S. Patent Application Publication No. 2013/0244288 which is herein incorporated by reference in its entirety.

A process according to the present invention for making a poly alpha-1,3-glucan film comprises: (a) dissolving poly alpha-1,3-glucan in a solvent composition to provide a solution of poly alpha-1,3-glucan; (b) contacting the solution of poly alpha-1,3-glucan with a surface; and (c) removing the solvent composition to form a poly alpha-1,3-glucan film.

For the preparation of the film, a solution of poly alpha-1,3-glucan is prepared. The solvent compositions include but are not limited to aqueous NaOH (where the NaOH concentration typically ranges from 4 to 6 wt %), aqueous KOH (typically 7.5-10 wt % in water), aqueous tetraethyl ammonium hydroxide (typically 20 wt %), or a mixture of DMSO dimethyl sulfoxide and LiCl (LiCl typically 3-5 wt %). A typical solution composition using aqueous bases can be 10% polymer, 6.8% KOH and rest water, or 10% polymer, 4% NaOH and rest water, or 7% polymer, 18.5% tetraethyl ammonium hydroxide and the rest water. The ability to dissolve poly alpha-1,3 glucan in aqueous NaOH and KOH solutions offers a significant advantage over wood pulp (cellulose). Poly alpha-1,3-glucan is mixed into the solvent by application of shear. For aqueous solvent systems, a slurry of the poly alpha-1,3-glucan polymer in water is made, followed by addition of concentrated aqueous base. The glucan polymer can be completely dried before use, or the moisture content in the polymer can be measured and accounted for in the solution preparation.

For film casting or extrusion, the polymer solution viscosity should be low enough to be flowable and processable, but high enough to form a continuous film without breaking up. The concentration of the poly alpha-1,3-glucan in solution to achieve these viscosities ranges from about 3 wt % to about 23 wt %.

The solvent composition may further comprise additives such as a solubility additive or a rheology modifier. In the aqueous solutions, urea (CAS Registry Number: 57-13-6) or glycerol (CAS Registry Number: 56-81-5) may be added where the amount of urea can be up to the weight of the polymer in the solution, and the amount of glycerol can be varied. Other additives can also be mixed into the solution, such as blends with other polymers soluble in the same solvent system.

The films may be produced by casting the solution onto a substrate using a rod coater or a draw down coater but can also be produced by other solution film casting methods such as extrusion through a slot die. Film casting is carried out by using casting techniques known to those skilled in the art. This includes pouring the solution on a support, and spreading the solution onto the support using a casting rod such as a Meyer rod or a doctor blade. The substrates include but are not limited to glass (coated with surfactant or without) and polyester films.

Post casting, the cast solution is subject to coagulation and washing steps to generate a film that can be free-standing. The film may be formed by directly immersing the cast solution plus substrate in a coagulation media, or by first subjecting the cast solution to a drying step to remove a part of the solvent, followed by coagulation and removal of the residual solvent. The solvent removal is performed at room temperatures or at elevated temperatures, preferably below 80 C. The coagulation media may comprise a non-solvent for poly alpha 1-3 glucan, such as methanol, water, or acids or a mixture thereof. The preferred acids are aqueous sulfuric acid or acetic acid. The coagulation media may also comprise other additives such as salt. After coagulation, the cast solution is converted into a film that can be removed from the substrate.

The process of the present invention further involves removal of the residual solvent composition in the formed film by washing. When poly alpha (1,3) glucan solution comprises an aqueous solvent system such as aqueous NaOH or aqueous KOH and the coagulation medium used is an acidic medium such as aqueous sulfuric acid, the corresponding salt (sodium sulfate or potassium sulfate) is formed during coagulation. The salt and residual acid are removed from the film by washing in water. When the coagulation bath is methanol, the base (NaOH or KOH) is removed from the film by repeated washing in methanol. The removal of the base into the coagulation bath results in an increase in the pH of the methanol bath. The base removal is considered complete when the pH of the bath as measured by a pH indicator strip does not change even after prolonged soaking of the film. When the poly alpha (1,3) glucan solution comprises a DMSO/LiCl solvent system, the preferred washing liquid is water. It should be noted that depending on the solvent removal technique, some residual solvent composition or its' constituents may be present in small amounts.

The process of the present invention further involves drying the film under tension to form a free-standing film. It should also be noted that haze in the final film can be dependent on the drying conditions.

The process of the present invention may optionally involve heating the film during or post drying. The film may also be plasticized by immersing the film in a solution of a plasticizing agent (such as 1-10 wt % glycerol or ethylene glycol in water). Addition of plasticizers in films to reduce brittleness is a technique known to those skilled in the art. The uptake of the plasticizer into the film depends on the concentration of plasticizer and the residence time in the plasticization bath.

The exact sequence of steps may be varied to get films of different properties. Depending on the process utilized, the films thus obtained can be clear and transparent, or hazy. The films can have a glossy or a matte appearance. They can be flexible and exhibit good dead fold characteristics. They can be twisted and dyed. The strength of the films were also found to depend on the process steps used. Cellophane packaging films have typical breaking stress of 100 MPa in the machine direction and about 60 MPa in the transverse direction. Some of the poly alpha 1,3 glucan films formed in this invention had breaking stress similar to Cellophane, which suggests that these films have sufficient tensile strength to be used as a packaging film. The films formed by air-drying followed by methanol coagulation are the clearest films. The permeability of the films can also be manipulated. Under most conditions, the films exhibit a good barrier to permeation of oxygen gas. High barrier to oxygen is desirable, specially in food-packaging applications. The films also exhibit high permeability of water vapor, similar to cellophane films. However, if desired, by variation of the process recipe used, the films can be made porous with air permeability that is within the measurable range for a Gurley permeometer.

Advantageously, the process of the present invention does not require the use of toxic chemicals, in particular carbon disulfide. In addition, fewer process steps are required to form the alpha-1,3-glucan film of the present invention compared to the conventional process for forming a cellulose film.

The present invention is directed toward a process for making a poly alpha-1,3-glucan film comprising: (a) dissolving poly alpha-1,3-glucan in a solvent composition to provide a solution of poly alpha-1,3-glucan; (b) contacting the solution of poly alpha-1,3-glucan with a surface; and (c) removing the solvent composition to form a poly alpha-1, 3-glucan film.

The solvent composition can be selected from the group consisting of aqueous sodium hydroxide, aqueous potassium hydroxide, aqueous tetraethyl ammonium hydroxide, and a mixture of lithium chloride and dimethyl sulfoxide.

The solvent composition can further comprise at least one of a solubility additive or a plasticizer additive. The solubility additive can be urea. The plasticizer additive can be glycerol.

The process of removing the solvent composition comprises evaporation and coagulation in water, acid or alcohol.

The present invention is also directed toward a poly alpha-1,3-glucan film made according to a process comprising: (a) dissolving poly alpha-1,3-glucan in a solvent composition to provide a solution of poly alpha-1,3-glucan; (b) contacting the solution of poly alpha-1,3-glucan with a surface; and (c) removing the solvent composition to form a poly alpha-1,3-glucan film.

The present invention is also directed toward a film comprising poly alpha-1,3-glucan.

The present invention is also directed toward a poly alpha-1,3-glucan film, wherein the film has at least one of: (a) haze less than about 10%; (b) breaking stress from about 10 to about 80 MPa; (c) tear strength from about 250 to about 3000 gf/mm; (d) Gurley air permeability less than about 10 s; and (e) oxygen permeation rate less than about 0.3 cc-mm/m² day at 23° C., 0% RH.

Test Methods

In the non-limiting examples that follow, the following test methods were employed to determine various reported characteristics and properties.

Degree of Polymerization (DP) and Polydispersity Index (PDI) were determined by size exclusion chromatography (SEC). The chromatographic system used was Alliance™ 2695 liquid chromatograph from Waters Corporation (Milford, Mass.) coupled with three on-line detectors: differential refractometer 410 from Waters, multiangle light scattering photometer Heleos™ 8+ from Wyatt Technologies (Santa Barbara, Calif.) and differential capillary viscometer ViscoStar™ from Wyatt. The software packages used for data reduction were Empower™ version 3 from Waters (column calibration with broad glucan standard, DR detector only) and Astra version 6 from Wyatt (triple detection method without column calibration). Four SEC styrene-divinyl benzene columns from Shodex (Japan) were used—two linear KD-806M, KD-802 and KD-801 to improve resolution at low molecular weight region of a polymer distribution. The mobile phase was N,N'-Dimethyl Acetamide (DMAc) from J.T Baker, Phillipsburg, N.J. with 0.11% LiCl (Aldrich, Milwaukee, Wis.). The chromatographic conditions were as follows: Temperature at column and detector compartments: 50° C., temperature at sample and injector compartments: 40° C., flow rate: 0.5 ml/min, injection volume: 100 ul. The sample preparation targeted 0.5 mg/mL sample concentration in DMAc with 5% LiCl, shaking overnight at 100° C. After dissolution, polymer solution can be stored at room temperature.

Air Permeability was determined using a Gurley Precision instrument model 4340, according to ASTM D 726—Standard Test Method for Resistance of Nonporous Paper to Passage of Air. The Gurley second or Gurley unit is a unit describing the number of seconds required for 100 cubic centimeters (1 deciliter) of air to pass through 1.0 square inch of a given material at a pressure differential of 4.88 inches of water (0.188 psi) (ISO 5636-5:2003).

Thickness of the film was determined using a Mitutoyo micrometer, No. 293-831.

Preparation for Tensile Testing

Films were measured with a ruler and 1"×3" strips were cut using a comfort loop rotary cutter by Fiskars, No. 195210-1001. The samples were then transported to the testing lab where room conditions were 65% relative humidity and 70° F.+/−2° F. The sample weight was measured using a Mettler balance model AE240.

Tensile Properties were measured on an Instron 5500R Model 1122, using 1" grips, and a 1" gauge length, in accordance with ASTM D882-09.

Film Clarity was determined using an Agilent (Varian) Cary 5000 uv/vis/nir spectrophotometer equipped with a DRA-2500 diffuse reflectance accessory in transmission mode. The DRA-2500 is a 150 mm integrating sphere with a Spectralon® coating. Total and diffuse transmission for the instrument and the samples are collected over the wavelength range of 830 nm to 360 nm. The calculations are made in accordance with ASTM D1003 using a 2 degree observer angle and illuminant C (represents average daylight, color temperature 6700K).

Oxygen and Water Vapor Permeability was determined using a MOCON Permatron-W 101K instrument according to ASTM F1927 and ASTM F1249 respectively.

EXAMPLES

Preparation of Poly alpha-1,3-glucan

Poly (α1,3 glucan), using a gtfJ enzyme preparation, was prepared as described in the co-pending, commonly owned U.S. Patent Application No. 61/532,714, which is incorporated herein by reference.

The Following Abbreviations were Used in the Examples

"DI water" is deionized water; "MPa" is megapascal; "NaOH" is sodium hydroxide; "KOH" is potassium hydroxide; "DPw" is weight average degree of polymerization; "DMSO" is dimethyl sulfoxide; "LiCl" is lithium chloride; "RH" is relative humidity and "s" is seconds.

Materials and General Methods

Sodium hydroxide, potassium hydroxide, acetic acid and sulphuric acid were from EMD Chemicals (Billerica, Mass.). Urea, lithium chloride, tetraethyl ammonium hydroxide, and dimethyl sulfoxide were from Sigma Aldrich (St. Louis, Mo.). Methanol was obtained from B.D.H Middle East (Dubai, UAE). Glycerol was from Acros Organics (Pittsburgh, Pa.).

Solution Preparation

Solutions were mixed with either an IKA overhead stirrer and 1 inch plastic blade stirrer or with a high shear mixer. For aqueous solvent systems, the slurry of the poly alpha-1,3-glucan polymer in water is made, followed by addition of concentrated aqueous base. The glucan polymer can be completely dried before use, or the moisture content in the polymer can be measured and accounted for in the solution preparation.

After thorough mixing, solutions were transferred to plastic centrifuge tubes and centrifuged using the Marathon 6K centrifuge by Fisher Scientific. Viscosity of the solution was measured using Brookfield Engineering laboratories Synchro-Lectric Viscometer, Model RVT. Films were cast using Chem Instruments Custom Coater EC-300 and a conventional film casting equipment like a wire wound casting rod, or doctor blade.

Example 1

Glucan in Base Solvent, with Alcohol Coagulation

Fifteen g glucan solid of DPw 1000 was mixed with 135 g 7.5 wt % KOH solution. It was mixed using a high shear mixer. A film was cast by pouring a controlled amount of solution onto a glass plate and then drawn down using a rod-coater and a 254 micron casting rod. The film was allowed to air dry for 45 minutes and then placed in a methanol bath. When the apparent pH of the bath as tested with a pH indicator strip went from 7 to 9, the bath was discarded and the film was placed in fresh methanol. Once the pH of the bath did not change, the film was removed from the methanol and allowed to dry on glass. The edges of the film were scored, a minimal amount of water was used to wet the edges of the film and then the film was peeled from glass on to a polyethylene or other inert, non shedding substrate. If the surface of glass was treated with a surfactant, wetting with water is not required to peel the film off. The film was allowed to air dry under tension and dried rapidly, resulting in a clear, strong film.

Films thus formed have a thickness of 25.4+/−7 micron, breaking stress as high as 50 MPa, tear strength of 3032 gf/mm, strain to break of 13% and haze of 1.3%. Another film was made using a solution of glucan of DPw 1200 (7.5% polymer concentration in solution) and similar protocol as above. The film thus formed had a thickness of 8 micron and breaking stress of 77 MPa and strain to break of 19%.

Replicates of these films were made and the water vapor and oxygen permeability of these films were measured. The films were found to be very permeable to water vapor with a permeation rate of >25.4 g-mm/m$^2$ day at 23 C, 90% relative humidity conditions. The films were less permeable to oxygen (offer a good barrier to oxygen), permeation rates as low as 0.13-0.22 cc-mm/m$^2$ day at 23 C, 0% relative humidity were measured. This suggests that these films show barrier characteristics comparable to cellophane, and hence can be used in similar applications.

Another film was formed using the solution with DPw 1000, but the cast solution was immediately submerged in methanol. The percentage water in the film before coagulation was about 85%.

Films thus formed had a breaking stress of 13.8 MPa and a haze of 98.5%. The film was almost white and opaque. Thus, the percentage dryness of the cast film before submerging in methanol affected the clarity of the film. Another film was formed using the solution made with DPw 1200 polymer, the film was allowed to dry for 10 minutes before coagulation in methanol. The percentage water in the film before coagulation was 78%. The film dried clear.

Example 2

Glucan Solutions in KOH with Alcohol Coagulation Followed by Heat Treatment

Fifteen g glucan solid of DPw 1000 was mixed with 135 g 7.5 wt % KOH solution. It was mixed using a high shear mixer. A film was cast by pouring a controlled amount of solution onto a glass plate and then drawn down using the rod-coater and a 254 micron rod. The film was allowed to air dry for 45 minutes and then placed in a methanol bath. When the apparent pH of the bath as tested with a pH indicator strip went from 7 to 9, the bath was discarded and the film was placed in fresh methanol. Once the pH of the bath did not change, the film was removed from the methanol and allowed to dry on the glass. The film was then heated in a convection oven at 60° C. for 10 mins. The edges of the film were scored, a minimal amount of water was used to wet the edges of the film and then the film was peeled from glass on to a polyethylene substrate. It was allowed to air dry and dried rapidly, resulting in a clear, strong film.

Films thus formed have a thickness of 17.8+/−3 micron, breaking stress as high as 66 MPa and strain at max load of 8%.

Example 3

Glucan Solution Using Urea and NaOH, Water Coagulation Post Drying

A solvent mixture of composition 4.1% NaOH and 5% urea was made by stirring NaOH and urea into DI water using a stir bar. A solution containing 9.1 wt % solution of glucan of DPw 800 was prepared by dissolving the polymer in the above mentioned solvent and using a homogenizer to obtain a well mixed solution. The solution was centrifuged to remove air bubbles and cast immediately or stored at −5° C. till use. A film was cast by pouring a controlled amount of solution onto a glass plate, and then drawn down using a 250 micron doctor blade. The film was left to air dry for four hours. The film was then washed by soaking in a DI water bath and left in another DI water bath overnight. The film peels off the glass slide when soaked it water. The edges of the film can be optionally taped down during soaking in water. After removal from the water bath, the film left to dry under tension on a flat, inert, non-shedding surface.

Films prepared using this technique had a thickness of 14 micron, haze of 3.9-4.26%, breaking stress of 35 MPa, tear strength of 258 gf/mm and a Gurley air permeability of 243+/−160 s.

Compared to Example 1, Example 3 has higher haze of 4.26% (lower clarity), lower strength and is more brittle.

Comparative Example A

Glucan Solution Using NaOH without Urea, Water Coagulation Post Drying

A similar process as in Example 3 was used except without urea in the casting solvent. A solvent mixture of composition 4.3% NaOH was made by stirring NaOH into DI water using a stir bar. A solution containing 9.1 wt % solution of glucan of DPw 800 was prepared by dissolving the polymer in the above mentioned solvent and using a homogenizer to obtain a well mixed solution. The solution was centrifuged to remove air bubbles and cast immediately or stored at −5° C. till use. A film was cast by pouring a controlled amount of solution onto a glass plate, and then drawn down using a 254 micron doctor blade. The film was left to air dry for four hours. The film was then soaked in a water bath for 1 hr. The film lifted off the glass plate within 5 mins. The film was then collected and left to dry on a flat, inert substrate.

Thus obtained film had a thickness of 21.6 micron, appeared translucent to the human eye, had a haze value of 20%, and breaking stress of 12.5 MPa.

Compared to Example 3, the solution for Comparative example A was less clear and had more haze. Compared to Example 1, Comparative Example A has higher haze of 20% (lower clarity), lower strength and is more brittle.

Example 4

Glucan Solution Using KOH, Cast Solution Dried at Elevated Temperatures Followed by Alcohol Coagulation Fifteen g glucan solid of DPw 550 was mixed with 135 g 7.5% KOH solution. It was mixed using a high shear mixer. A film was cast by pouring a controlled amount of solution onto a glass plate and then drawn down using the rod-coater and a 254 micron rod. The film was heated at different times and temperatures around 60° C. in a convection oven to expedite the drying process, and then placed in a methanol bath. When the apparent pH of the bath as tested with a pH indicator strip went from 7 to 9, the bath was discarded and the film was placed in fresh methanol. Once the pH of the bath did not change, the film was removed from the methanol and allowed to dry on the glass. The edges of the film were scored, a minimal amount of water was used to wet the edges of the film and then the film was peeled from glass on to a polyethylene substrate. If the surface of glass was treated with a surfactant, wetting with water is not required. It was allowed to air dry under tension and dried rapidly, resulting in a clear, strong film.

Films thus formed had a haze of 13%. The strength of these films are shown in the Table, where MD refers to the machine direction of casting and TD refers to the transverse direction of casting. In practise, drying at elevated temperatures would be employed to reduce the drying time. It should be noted that elevated temperatures beyond 80° C. during drying can result in degradation of the polymer to form sugars. For example, the cast solutions that were heated to 80° C. for 1 hour developed a brown color post-heat treatment (due to sugar formation), and also resulted in weaker films after washing and drying.

TABLE

Glucan Film Tensile Properties

| Heat Treatment | Maximum Stress (MPa) | Maximum Strain (%) |
|---|---|---|
| 60° C. at 10 min MD | 45 | 17.0 |
| 60° C. at 10 min TD | 32 | 7.7 |
| 60° C. at 60 min MD | 61 | 4.7 |
| 60° C. at 60 min TD | 74 | 4.4 |

Example 5

Glucan Solution Using Urea NaOH, Direct Water Coagulation

A solvent mixture of composition 4.1% NaOH and 5% urea was made by stirring NaOH and urea into DI water using a stir bar. A solution containing 9.1 wt % solution of glucan DPw 1000 was prepared by dissolving the polymer in the above mentioned solvent and using a homogenizer to obtain a well mixed solution. The solution was centrifuged to remove air bubbles and cast immediately or stored at −5° C. till use. A film was cast by pouring a controlled amount of solution onto a glass plate, and then drawn down using a 254 micron doctor blade. The film was then immediately coagulated in a DI water bath and left to soak for 3 hrs and dried overnight on a paper towel. Thus obtained film had a thickness of 22.9 micron, was translucent to the human eye, had a haze of 20.3% and breaking stress of 9.7 MPa.

Example 6

Glucan Solution Using NaOH/Urea, Direct Acid Coagulation

A solvent mixture of composition 4.1% NaOH and 5% urea was made by stirring NaOH and urea into DI water using a stir bar. A solution containing 9.1 wt % solution of glucan DPw 1000 was prepared by dissolving the polymer in the above mentioned solvent and using a homogenizer to obtain a well mixed solution. The solution was centrifuged to remove air bubbles and cast immediately or stored at −5° C. till use. A film was cast by pouring a controlled amount of solution onto a glass plate, and then drawn down using a 254 micron doctor blade. The film was immediately coagulated in a 5% acid bath (sulphuric acid), and washed and left to soak in water for 3 hrs and dried overnight on a glass plate under tension. Thus obtained film had a thickness of 24.1 micron, haze of 9.8%, and breaking stress of 10.1 MPa. Another film was made using a similar procedure but with a 20% acid bath for coagulation. Thus obtained film had a thickness of 24.1 micron, haze of 2.9% and a breaking stress of 21 MPa.

Compared to Example 1, Example 6 films showed more shrinkage when dried after washing in water. The clarity and strength of the films were found to depend on the tension maintained on the film during drying after washing with water.

Example 7

Glucan Film from Glucan Xanthate Solution, Acid Coagulation

A solution of glucan xanthate was prepared by dissolving glucan in 4.5% NaOH solution and derivatizing using carbon disulfide. The final polymer concentration was 8 wt % glucan polymer DPw 1000). The film was cast by pouring a controlled amount of solution onto a glass plate and then drawn down using a 254 micron doctor blade. After 5 mins of air drying, the film on the plate was coagulated in a 5 wt % H2SO4 bath for 10 mins. The film on the glass plate was then soaked in DI water for 3 hrs, then rinsed with DI water several times and dried overnight. The film thus made had a thickness of 19.05 micron and a breaking stress of 14 MPa. Some bubbling was observed during coagulation. It is believed that with better control over coagulation, the film strength obtained can be improved. This example shows that glucan films can also be made using xanthated solutions, similar to the viscose solutions used for making cellophane.

Example 8

Glucan Film from Glucan Xanthate Solution, Coagulation Post Drying

A solution of glucan xanthate was prepared by dissolving glucan in 4.5% NaOH solution and derivatizing using carbon disulfide. The final polymer concentration was 8 wt % glucan polymer (DPw 1000). The film was cast by pouring a controlled amount of solution onto a glass plate and then drawn down using a 254 micron doctor blade. The film on the glass plate was air dried for 3 hrs, then coagulated in 5 wt % $H_2SO_4$ bath for 8 mins and soaked in DI water for 30 mins. The film was then rinsed with DI water several times and dried overnight. The film thus made had a thickness of 25.5 micron and a breaking stress of 42 MPa. Some bubbling was observed during coagulation. It is believed that with better control over coagulation, the film strength obtained can be improved. This example shows that glucan films can also be made using xanthated solutions, similar to the viscose solutions used for making cellophane.

Example 9

Plasticization

A glucan film was made using the same treatment as Example 2. The film was then soaked for 10 mins in a 10% glycerol solution and then collected on aTeflon® FEP film and dried under tension. Thus obtained film gain 37% by weight of plasticizer, had improved flexibility, exhibited a 325% increase in maximum strain with a 67% loss in breaking stress. Another film subjected to a 30 s soak in 10% glycerol exhibited a 250% increase in maximum strain with a 67% loss in break stress.

Example 10

Dyed Glucan Films

A film was prepared as described in Example 2. The film was dyed by soaking in an excess of 3% basic red #29 or 2.5% solution of direct red 80 dissolved in water for one hour. The films were then washed three times in DI water. The films appeared colored as observed by the human eye.

Example 11

Glucan Films from DMSO:LiCl Solution

A 6 wt % glucan solution (DPw 1000) was mixed in a solvent composed of DMSO and 3% LiCl. It was mixed using overhead stirrer in a round bottom flask for 60 minutes. Films were cast using 508 micron and 254 micron rods, dried in an oven at 30° C. under vacuum for 16 hours and washed in water. Films thus formed were clear and transparent, but had significant shrinkage and wrinkles. Another film was cast using 254 micron rod, dried on a hot plate at 100° C. and then washed with water to remove the LiCl salt. Thus obtained film had a thickness of 28 micron, and breaking stress of 23 MPa.

Example 12

Glucan Films Using Tetraethyl Ammonium Hydroxide

A solution composed of 5% glucan (DPw 1000), 20% tetraethyl ammonium hydroxide and 75% water was made by mixing the polymer, base and water using a magnetic stir bar. A film was cast by pouring a controlled amount of solution onto a glass plate, and then drawn down using a 254 micron doctor blade and left to dry overnight. The film was then coagulated in a 5% acetic acid bath, washed with water and dried overnight on a non-shedding surface under tension. The film was then peeled off. Thus obtained film was transparent, had thickness of 11.3 micron, breaking stress of 60 MPa and strain to break of 13%.

What is claimed is:

1. A process for making a poly alpha-1,3-glucan film comprising:
    (a) dissolving poly alpha-1,3-glucan in a solvent composition to provide a solution of poly alpha-1,3-glucan, wherein the solvent composition is selected from the group consisting of aqueous sodium hydroxide, aqueous potassium hydroxide, and aqueous tetraethyl ammonium hydroxide;
    (b) contacting the solution of poly alpha-1,3-glucan with a surface;
    (c) removing the solvent composition to form a poly alpha-1,3-glucan film; and
    (d) determining the film to have at least one of:
        (i) haze less than about 10%;
        (ii) breaking stress from about 10 to about 80 MPa;
        (iii) tear strength from about 250 to about 3000 gf/mm;
        (iv) Gurley air permeability less than about 10 s; and
        (v) oxygen permeation rate less than about 0.3 cc-mm/m$^2$ day at 23° C., 0% relative humidity (RH).

2. The process according to claim 1, wherein the process further comprises the addition of a plasticizer additive to the solution of the poly alpha-1,3-glucan of step (a) and wherein the plasticizer additive is glycerol.

3. The process according to claim 1, wherein the step (c) removing the solvent composition comprises evaporation and coagulation in water, acid or alcohol.

4. A poly alpha-1,3-glucan film made according to claim 1.

5. The process of claim 1, wherein the solvent composition is aqueous sodium hydroxide.

6. The process of claim 1, wherein the solvent composition is aqueous potassium hydroxide.

7. The process of claim 1, wherein the solvent composition is aqueous tetraethyl ammonium hydroxide.

* * * * *